United States Patent Office 3,277,783
Patented Oct. 11, 1966

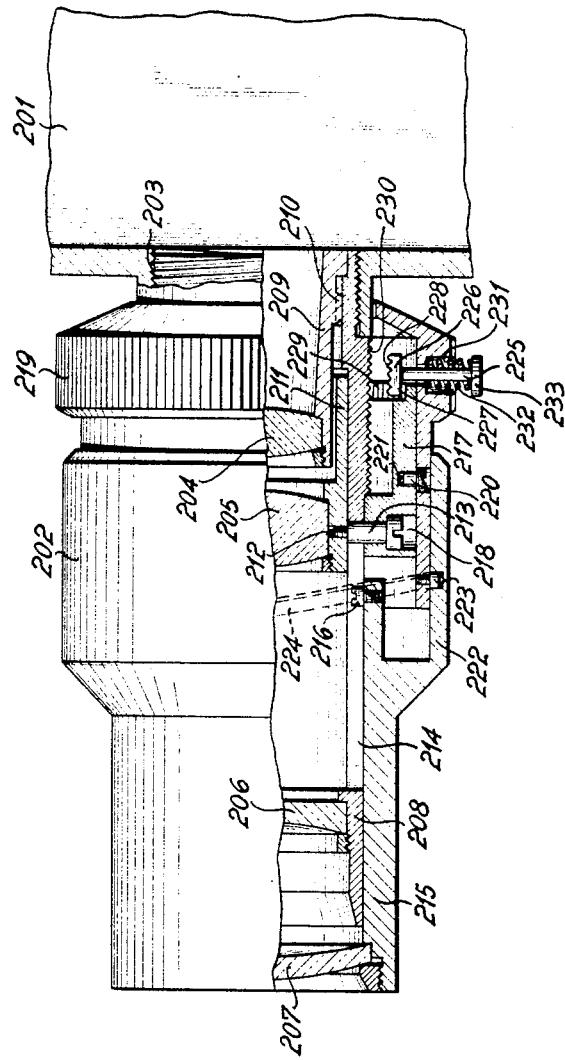

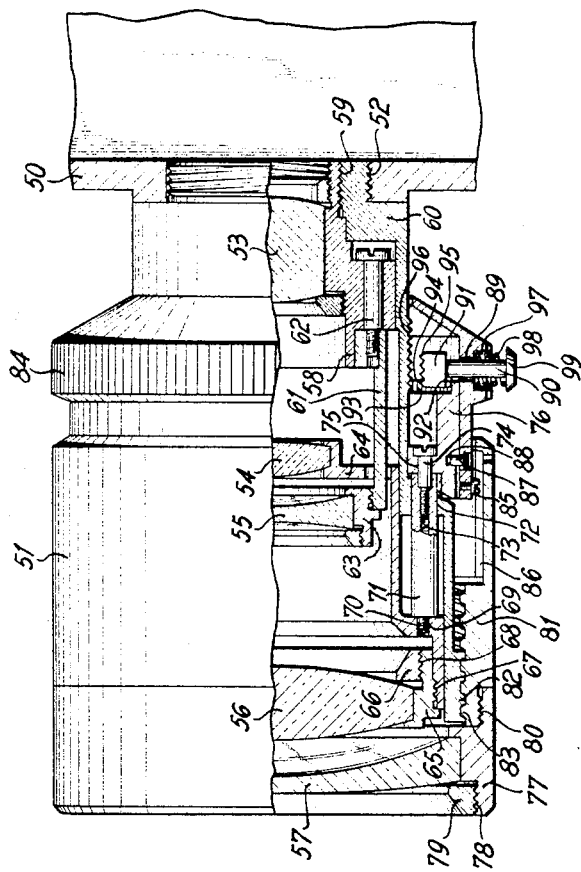

3,277,783
ZOOM LENS MOUNT HAVING A COMMON SETTING MEANS FOR TWO INDEPENDENT ADJUSTMENTS
Joachim Eggert, Braunschweig, Germany, assignor to Voigtlander A.G., Braunschweig, Germany, a corporation of Germany
Filed Dec. 11, 1962, Ser. No. 243,853
Claims priority, application Germany, Feb. 28, 1962, V 22,107
13 Claims. (Cl. 88—57)

This invention relates to objectives with variable focal lengths and a constant intercept length on the image side, and provided with a common adjusting means used both for focusing and for adjusting the focal length, one adjustment being effected by axial displacement of the setting means and the other adjustment by angular displacement of the setting means.

More particularly, the present invention is directed to an objective of this type including means inhibiting inadvertent alteration of one adjustment during the making of the other adjustment.

Objectives of the mentioned type may take various forms. In one form, the objective includes stationary lenses or groups of lenses cooperable with other lenses or group of lenses which are displaceable axially of the objective to alter its focal length. The axially displaceable lenses or lens groups are further axially displaceable relative to each other to focus the objective.

Another form of objective of the mentioned type includes mutually fixed and stationary lenses or sets of lenses, and other sets of lenses adjustable axially of the objective relative to the fixed lenses to alter the focal length of the objective. Additional lens sets are included in the objective, and are mounted for adjustment axially thereof relative both to the fixed lens and the lenses adjustable for setting the focal length, and these additional lenses are used to focus the objective. In this form of objective, those lenses or sets of lenses which are axially adjustable to alter the focal length remain fixed with respect to the stationary lenses or sets of lenses during focusing of the objective, so that the focal length of the objective is not altered during focusing thereof.

In still another type form of objective of the mentioned type, a common means is used both to adjust the focal length and to focus the objective, and this means is usually a lever or the like which, when adjusted axially of the objective, changes the focal length, and when adjusted angularly of the objective axis, focuses the objective, or vice versa.

With objectives of this latter type, it may happen that, during adjustment of the focal length of the objective by the common adjusting means, the focusing of the objective may be inadvertently altered, as when the operator, in moving the common adjusting means axially to alter the focal length, inadvertently rotates the common adjusting means about the optical axis. Alternatively, such inadvertent adjustment may occur when the operator, during focusing of the objective by rotating the common setting means, inadvertently alters the focal length in an undesired manner by inadvertently shifting the common setting means axially of the objective.

The present invention is directed to the provision of an objective having means for obviating the occurrence of such inadvertent changes in adjustment. To this end, the present invention is directed to a variable focus objective with a constant intercept length on the image side and a common setting means for adjusting both the focal length and the focusing of the objective, with one adjustment being effected by displacing the setting means in one setting direction and the other adjustment being effected by displacing the setting means in another setting direction. More particularly, in the present invention a locking device is provided which can be coupled with the setting means to lock it against movement in one setting direction while the setting means is displaced in the other setting direction.

By the use of a locking means in accordance with the present invention, the common setting means can be fixed against axial movement during angular movement of the common setting means, and fixed against angular movement during axial movement of the common setting means.

With one form of locking device embodying the invention, it is possible, during angular displacement of the setting means for focusing the objective, to lock the setting means against axial displacement and, during axial displacement of the setting means to alter the focal length of the objective, to lock the setting means against angular displacement. Therefore, with the invention arrangement, it is impossible to inadvertently change the focal length of the objective during focusing of the latter, or to inadvertently change the focus adjustment during alteration of the focal length.

For an understanding of the principles of the invention, reference is made to the following description of typical embodiments thereof as illustrated in the accompanying drawings. In the drawings:

FIGS. 3, 4 and 5 are views, similar to FIG. 1, illustrating other embodiments of objectives in accordance with the invention.

Figure 1:
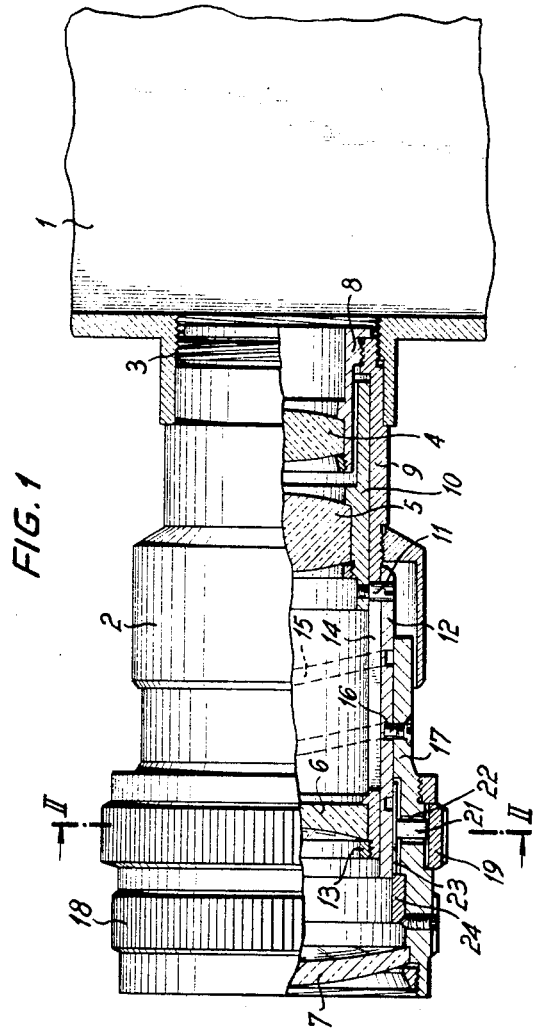
FIG. 1 is a side elevational view, partly in section, of one embodiment of an objective in accordance with the invention, in association with an objective mount.

Referring to FIG. 1, the housing of a camera or a projector is illustrated at 1 as arranged to have an objective 2 fixedly mounted therein by means of threads 3. In a known manner, objective 2 includes several lens groups 4, 5, 6 and 7 which, for the sake of simplicity, are shown as individual lenses.

Lens group 4 is fixed in a mounting 8 which is fixedly coupled with a mounting tube 9, and a lens group 6 is fixedly secured in mounting tube 9 by means of a retaining ring 13. Tube 9 further serves as the support for the movable mounts of lens groups 5 and 7, which are adjustable, relatively to the fixed lens groups 4 and 6, to change the focal length of the objective and to focus the objective.

Lens group 5 is fixedly positioned in a mounting 10 which is adjustable axially in the mounting tube 9. A pin 11, or other suitable means, fixedly connects mounting 10 with a setting tube or cylinder 12 which is also adjustable axially of the tube 9, the latter being formed with a longitudinally extending guide slot 14 for the pin 11. The outer surface of setting tube 12 is formed with a helical groove 15 in which is engaged a stud, or the like, 16 secured in an adjusting sleeve 17 embracing the setting tube 12. Sleeve 17 supports the lens group 7 forming the front member of the optical system, and carries a knurled ring 18 which is secured to or formed integrally with adjusting sleeve 17.

When knurled ring 18 is displaced axially of objective 2, sleeve 17 is also displaced axially of the objective. Through engagement of stud 16 in helical groove 15, setting ring 12 and mounting 10 are displaced axially of mounting tube 9. The lens groups 7 and 5 which are mounted in axially displaceable elements 17, 12, and 10 are thus conjointly displaced axially of the objective and with respect to the lens groups 4 and 6 which remain stationary. Thus, upon such axial displacement of ring 18, the focal length of the objective is changed.

When knurled ring 18 is rotated about the axis of objective 2, stud 16 secured to sleeve 17 moves along helical groove 15 in setting tube 12. Setting tube 12 remains stationary so that, due to the interaction between stud 16 and groove 15, sleeve 17 is displaced axially in accordance with the pitch of helical groove 15. Lens group 7 is thus adjusted axially with respect to lens groups 6, 5 and 4, which remain stationary, so that the objective is focused.

In accordance with the invention, manually operable lock means are provided which are effective, during changing of the focal length of objective 2 by axial displacement of ring 18, to prevent inadvertent rotation of ring 18 and thus to prevent any change in the adjusted focus of the objective. This means acts to lock adjusting sleeve 17, supporting lens group 7, with respect to the mounting parts supporting lens group 5.

Figure 2:
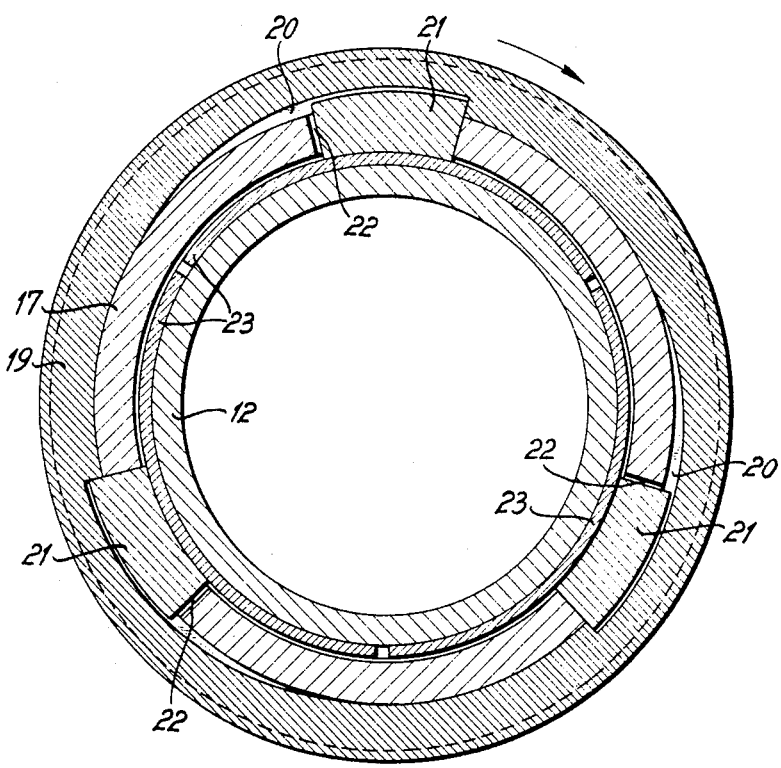
FIG. 2 is a diametric sectional view taken on the line II—II of FIG. 1.

In the arrangement illustrated in FIG. 2, a locking ring 19 is mounted to embrace the outer surface of sleeve 17, and is provided with three clamp operating cam surfaces 20 having their midpoints displaced angularly by 120° from each other. Clamping means are provided in which clamping jaws 21 engage cam surfaces 20, these clamping jaws 21 extending axially of the objective. Clamping jaws 21 are mounted in slots 22 in sleeve 17 for radial movement relative to the sleeve. Jaws 21 have their inner surfaces in engagement with respective spring biased tongues or fingers 23 formed on a ring 24 secured in adjusting sleeve 17. The inner surfaces of the spring biased tongues 23 embrace the outer surface of adjusting tube or cylinder 12.

Dependent upon the relative angular position of locking ring 19, tongues 23 either are displaced a slight distance from the outer surface of the tube 12 or they are clamped firmly against the outer surface of tube 12 by virtue of clamping jaws 21 coacting with cam surfaces 20 of ring 19. When thus clamped, adjusting sleeve 17 forms a rigid assembly with setting tube 12 and mounting unit 10. Lens groups 7 and 5 are thus fixed with respect to each other and can be conjointly displaced with respect to stationary lens groups 4 and 6 to alter the focal length of the objective. However, during such adjustment of the focal length, adjusting sleeve 17 carrying front lens group 7 cannot move relative to setting tube 12 and mounting unit 10, and thus is fixed against movement with respect to lens group 5, so that the adjusted focusing of the objective does not change. It is only after rotation of the locking ring in an unlocking direction to release spring loaded tongues 23 from setting tube 12 that front lens group 7 can be shifted axially with respect to lens groups 6, 5 and 4 to focus the objective.

Figure 3:
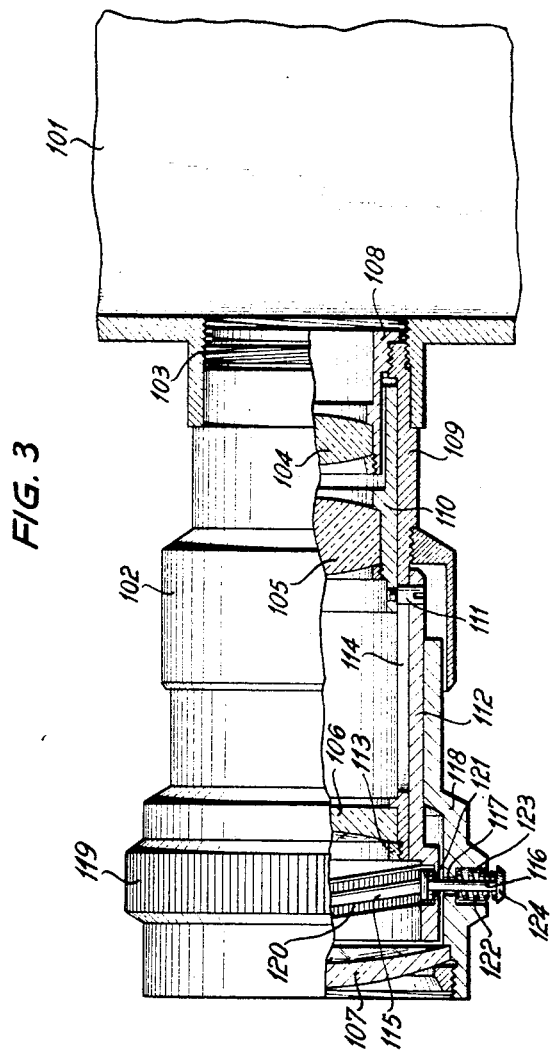

Insofar as respects its general overall design, and particularly its optical design, the objective 102 shown in FIG. 3 is essentially identical with the objective shown in FIG. 1. Objective 102 is secured in a camera or projector housing 101, as indicated by the threads 103. Its optical elements include the fixedly mounted lens groups 104 and 106, and the axially displaceable lens groups 105 and 107. Lens group 107 is also axially displaceable with respect to lens groups 104 and 106, as well as with respect to axially displaceable lens group 105, for the purpose of focusing the objective. For this purpose, a helical slot 115 is formed in setting tube 112 fixedly coupled to mounting 110 for lens group 105, by means of a pin 111. The inner surface of setting tube 112, on either side of slot 115, is knurled or formed with teeth as indicated at 120, and the teeth 120 are engageable with cooperating teeth 121 on a locking pin 116. Pin 116 extends through slot 115 and is longitudinally displaceable in a bore 117 through adjusting sleeve 118 to form a manually operable lock means. Adjusting sleeve 118 is positioned on tube 112 and serves as a mounting or support for lens group 107. Sleeve 118 further has a portion formed with a knurled rim 119 and serving as the common setting means for altering the focal length and focusing the objective.

Pin 116 is provided with an operating head 124 extending beyond the knurled rim 119, pin 116 being biased outwardly by a spring 122 embracing the pin. Spring 122 thus biases pin 116 to a position in which its teeth 121 intermesh with the teeth 120 on the inner surface member 112, thus forming a releasable detent means. Thereby, knurled rim 119 is fixed against angular displacement about the axis of the objective due to the interengagement of the teeth preventing movement of pin 116 along the slot 115. It will be noted, in this connection, that member 112 is fixed against angular displacement, although being axially displaceable, through the medium of the slot 114 engaged by the pin 111. By axial displacement of knurled rim 119, only lens groups 107 and 105 are axially displaced to alter the focal length of the objective.

In order to focus the objective, it is necessary to unlock the ring 119. This is effected by pressing pin 116 inwardly, as by the hand gripping the knurled rim 119. This disengages the knurled sections or teeth 120 and 121 so that pin 116 can now travel along helical groove 115 when rim 119 is rotated. As the result of travel of pin 116 along helical groove 115, front lens group 107 is displaced axially by an amount corresponding to the pitch of helical groove 115.

The objective 202 shown in FIG. 4 is substantially identical in optical design with the objectives of FIGS. 1 and 3, and the lens groups are again represented, for the sake of simplicity, as single lenses. Objective 202 is secured in housing 201 by means of the thread 203, and includes the fixedly mounted lens groups 204 and 206 as well as the axially displaceable groups 205 and 207. Axial displacement of groups 205 and 207 relative to lens groups 204 and 206 alters the focal length of the objective. Similarly to the case with respect to the objectives of FIGS. 1 and 3, lens group 207 can be displaced axially not only with respect to fixed lens groups 204 and 206 but also with respect to the axially displaceable lens group 205, in order to focus the objective. Lens group 206 is fixed inside a mounting tube 208 which is formed with thread 203 for locking the objective 202 in the housing 201. A mounting tube 209 is fixedly coupled with mounting tube 208 by means of a thread 210, and supports the other fixed or stationary lens group 204. A mount 211 is displaceable axially of the tube or cylinder 208, and supports lens group 205. A pin 213, screwed into a threaded bore 212 in mount 211, is engaged in a slot 214 extending longitudinally of mounting tube 208. An adjusting sleeve 215 is mounted for axial displacement on tube 208, and serves to support front lens group 207.

A pin 216, screwed into a threaded aperture in sleeve 215, has its head engaged in slot 214 of tube 208. By virtue of the described arrangement, mount 211 or adjusting sleeve 215 are displaceable only in an axial direction. A member 217 is mounted for axial displacement on tube 208, and is formed with a stepped bore 218 seating the head of a pin 213 which is designed as a fitted bolt and which fixedly connects ring 217 and mount 211. A setting device 219 is rotatable on the ring 217 about the optical axis of the objective, and is guided for such rotational movement by means of a stud 220 having its head seated in device 219 and having a reduced stud engaged in a circumferential groove 221 in ring 217. The end of adjusting sleeve 215 nearer housing 201 is designed as an adapter tube 222 engaging the periphery of setting device 219, and the latter carries a bolt 223 having a head engaged in a helical groove 224 in the inner surface of portion 222 of sleeve 215.

The parts so far described operate in the following manner. When setting device 219 is displaced axially of the objective to alter the focal length, ring 217 is simultaneously displaced axially of the objective by virtue of stud 220 having its stem engaged in circumferential groove 221 in ring 217. Pin 213 interconnects part 217 with part 211, and therefore lens group 205 is also adjusted axially of the objective. Furthermore, sleeve 215 is also displaced axially of the objective responsive to axial displacement of setting member 219. This is effected by virtue of the head of pin 223 being engaged in the helical groove 224 of sleeve 215. Adjustment of sleeve 215 thus adjusts the front lens 207 axially along the objective.

To focus the objective, setting device 219 is rotated about the optical axis of the objective with stud 220 moving freely along circumferential groove 221 without causing any movement of part 217. On the other hand, bolt 223, due to its engagement in helical groove 224, moves the element 215 axially due to the element 215 being retained against angular or rotational movement by virtue of the head of pin 216 being engaged in longitudinal slot 214. Thus, front lens group 207 is displaced axially to adjust the focusing of the objective, but lens group 205 remains fixed against axial movement.

To prevent unintentional rotation of setting device 219 by an operator upon displacement of the setting device axially of the objective to alter the focal length, and which unintentional rotation would adversely affect the focal length adjustment, a manualy operable locking means is provided. Specifically, setting device 219 is formed with a bore through which extends a locking pin 225 formed with a locking head 226 which is provided with two knurlings or sets of teeth which are distinct and which are in opposition to each other. A first knurled section 227 on the pin 225 is cooperable with a knurled section 229 on ring 217. The second knurled section 228 of pin 225 is cooperable with a knurled section 230 on mounting tube 208, and formed as a series of longitudinally distributed circumferential grooves arranged on the outer surface of tube 208. A spring 232 seated in a recess 231 has one end engaging the operating head 233 of pin 225, and biases knurling 227 of head 226 to engage knurling 229 of ring 217. This structure thus forms a releasable detent means and inhibits relative rotation of setting device 219 about the optical axis of the objective. At the same time, the bias of spring 232 tends to assure disengagement of knurled section 228 of head 226 from knurled section 230 of tube 208, thus providing for axial displacement of setting device 219. So long as the spring 232 is extended, setting device 219 can be displaced only axially without altering the focusing adjustment.

Should a focusing adjustment be necessary, knurling 227 of head 226 must be disengaged from knurling 229 of part 217, which is effected by pressing locking pin 225 inwardly. Pin 225 must be depressed far enough inwardly for knurling 227 of head 226 to disengage knurling 229 of ring 217, and for knurling 228 of head 226 to engage knurling 230 of tube 208. This has the effect of inhibiting axial displacement of setting means 219 while allowing rotational adjustment of the setting device 219 about the optical axis of the objective to focus the same.

The locking device is furthermore capable of providing for simultaneous adjustment or alteration of the focal length and adjustment of the focus of the objective. To attain this effect, pin 225 must be depressed only far enough for knurling 227 of head 226 to disengage knurling 229 of ring 217 while knurling 228 of head 226 remains out of engagement with knurling 230 of tube 208.

In the embodiment of the invention shown in FIG. 5, a housing 50, of a camera or projector, has an objective 51 fixedly mounted thereon by means of threads 52. In a known manner, objective 51 is provided with lens groups 53, 54, 55, 56 and 57 which, for the sake of simplicity, are shown as single lenses. Objective 51 differs, in its optical design, from the previously described objectives in that it is provided with two stationary lens groups 53 and 55 which are cooperable, for the purpose of altering the focal length, with two lens groups 54 and 56 which are incapable of relative displacement with respect to each other but which can be conjointly axially displaced relative to lens groups 53 and 55. Lens group 57 can be axially displaced to focus the objective, such axial displacement taking place with respect to the lens groups 53, 54, 55 and 56 independent of these latter lens groups.

Lens group 53 is fixedly positioned in a mounting member 58 which is fixedly coupled with a stepped mounting tube 60 by means of a thread 59. A tube 61 is fixedly coupled to mounting member 58 by means of a screw 62 and, through the medium of a ring 63, supports lens group 55. Tube 60 is formed with threads 52 for securing objective 51 in housing 50. For the sake of ready distinction, the fixed mounts and lens groups, which are not displaceable with respect to housing 50, are indicated by relatively close cross hatching, these fixed elements comprising the elements 58, 60, 61 and 63 in lens groups 53 and 55. Mounting tube 60 also serves as a bearing for the mounts or mounting members for the lens groups 54 and 56 which are displaceable axially with respect to lens groups 53 and 55 to alter the focal length. Tube 60 also serves as the bearing for the mounting means or members for lens group 57 which is displaceable axially with respect to stationary lens groups 53 and 55 for focusing of the objective. In order to clarify the disclosure in the drawing, those mounting members which are adjustable for the purpose of range setting by axial adjustment of lens group 57, are indicated by relatively open cross hatching so as to be readily distinguishable from those lens groups used for alteration of the focal length of the objective.

Lens group 54 is mounted in a tube 64 which is mounted for axial displacement in stepped mounting tube 60. Tube 64 also mounts lens group 56 through the medium of the rings 65 and 66 which are screwed into the threads 67 and 68 respectively. Tube 64 is formed with three threaded bores parallel to its axis and arranged in a circle centered on the optical axis of the objective, the threaded bores 69 being displaced from each other by angles of 120°. These threaded bores receive the threaded ends 70 of three connecting rods 71. Three bearing holes, receiving the connecting rods 71, are formed in mounting tube 60 to extend parallel to the optical axis of the objective and lie along a circle concentric with the optical axis of the objective, bearing holes or apertures 72 being mutually displaced by angles of 120°. The ends of rods 70 toward the housing 50 are formed with threaded bores 73 which receive screws 74 extending through bores 75 in a slip ring 76, bores 75 extending parallel to the optical axis of the objective and being arranged on a circle and at angles of 120° displacement from each other. Thereby, rods 71 are fixedly coupled to slip ring 76.

Connecting rods 71 thus form a rigid assembly with the fixedly related mounting members 64, 65, 66 and 76, the rigid unit including the threads 67, 68 and 69 and the screws 74. This rigid assembly supports lens groups 54 and 56 and, due to the axial displaceability of rods 71 through bearing holes 72 of tube 60, the rigid assembly can be displaced axially of the objective but cannot be rotated about the objective optical axis. A displacement of the rigid assembly axially of the objective changes the focal length of the objective.

The front lens group 57, which is used exclusively for focusing or range setting, is mounted in a front mounting unit 77 by means of a retaining ring 79 screwed into a thread 78. Mounting unit 77 is fixedly connected with a tube 81 by means of a thread 80, and tube 81 has a thread 83 meshing with a thread 82 on mounting tube or cylinder 60.

The setting means is preferably a knurled ring 84 which is both rotatable about the optical axis of the objective and displaceable axially of the objective. Ring 84 has a telescoped mounting on tube 60 and on the outer surface of slip ring 76. A pin, bolt or lug 85 is secured in ring 84 and engaged in a groove 86 extending longitudinally of the inner surface of tube 81. A second pin or abutment 87 is fixed to knurled ring 84 and is engaged in a groove 88 extending circumferentially of slip ring 76. The cooperation of pin 85 and groove 86 prevents rotation of knurled ring 84 relative to tube 81, and the cooperation of pin 87 and groove 88 prevents axial displacement of knurled ring 84 relative to slip ring 76.

The arrangement of FIG. 5 operates in essentially the following manner. When setting device 84 is displaced axially, the engagement of pin 87 in groove 88 moves slip ring 76 axially. Through the medium of tie rods 71 and screws 74, axial movement of slip ring 76 axially displaces mounting 64 of lens group 54, as well as lens group 56 which is secured in mount 64 by clamping rings 65 and 66. Such displacement is effected with respect to stationary lens groups 53, 55 and 57, so that the focal length of objective 51 is altered by axial movement of setting device 84. During such axial displacement of setting device 84, pin 85 moves longitudinally of groove 86 in tube 81, so that tube 81 remains stationary and there is no change in the focus or range setting of the objective 51.

When setting device or knurled ring 84 is rotated, tube 81 is rotated due to the engagement of pin 85 in groove 86. Such rotation of tube 81, through the medium of the intermeshing threads 82 and 83, effects axial displacement of tube 81 due to mounting tube 60 being fixed against movement. Lens group 57 is thus displaced axially with respect to lens groups 53, 54, 55 and 56, so that the range setting or focusing of the objective is changed. No change is effected in the focal length of the objective upon rotation of the setting ring 84, since pin 87 moves along circumferential groove 88 so that there is no change in the position of those parts which are adjusted to change the focal length.

A manually operable locking means is provided to prevent an inadvertent change in the range setting or focusing during an axial displacement of setting unit 84 to alter the focal length, and also to prevent an inadvertent change in the focal length, by inadvertent axial movement of setting unit 84, during rotation of the latter to effect a change in the focusing or range setting. This locking means, during axial displacement of member 84 to effect a change in the focal length, locks the member 84 against rotational movement and, during rotation of member 84 to change the focus, locks the member 84 against axial displacement. Thus, during changing of the focal length of the objective, front lens unit 57 is locked against axial displacement relative to stationary lens units 53 and 55 and, during rotational movement of setting device 84, lens groups 54 and 56 are retained against axial displacement relative to stationary lens groups 53 and 55.

To provide such a locking effect, setting device 84 is formed with a radial bore 89 receiving a locking pin 90 which is thus displaceable radially with respect to the optical axis of the objective. Pin 90 has an inner head 91 with oppositely facing teeth or knurls. One set of teeth or knurls 92 extends axially of the objective and is cooperable with knurls or teeth 93 on the inner surface of slip ring 76. Another set of knurls 95 extends circumferentially of the optical axis of the objective, or perpendicularly thereto, and these teeth 95 are cooperable with knurls or teeth 96 extending circumferentially of fixed mounting tube 60. Bore 91 terminates outwardly in a recess 97 which has a compression spring 98 seated therein and which also engages beneath the operating head 99 of pin 90. Due to the bias of spring 98, knurled teeth 92 of head 91, extending longitudinally of the optical axis, are normally meshed with knurled teeth 93 to lock setting ring 84 against rotation relative to slip ring 76, which is incapable of rotation, and is only capable of axial displacement. Thereby, the structure provides a releasable detent means and setting device 84 is normally locked against rotary movement for effecting a range setting or focusing of the objective, and can only be displaced axially.

To adjust the range setting or focusing of the objective, it is necessary to release the locking means preventing rotation of ring 84. This is effected by pushing locking pin 90 inwardly so that its teeth 92 disengage teeth 93, and its teeth 95 engage teeth 96. In this position of locking pin 90, ring 84 may be rotated but is locked against axial displacement relative to mounting tube 60. Rotation of ring 84 to adjust the range of focusing is thus possible only when locking pin 90 is depressed and, upon release of locking pin 90, it is biased to a position where ring 84 is locked against rotation.

To prevent inadvertent axial movement of ring 84 during intentional rotation thereof to adjust the focusing, pin 90 is moved not only far enough to disengage teeth 92 from the teeth 93 but also to the limit of movement of pin 90 wherein teeth 95 will engage teeth 96 and thereby prevent such axial displacement. However, if desired, pin 90 may be moved in only far enough to disengage teeth 92 from teeth 93 without engaging teeth 95 with teeth 96, teeth 95 extending only part of the way through the gap 94 toward the teeth 96. This will provide, if such is desired, for both rotational and axial adjustment of the setting device 84.

While specific embodiments of the invention have been shown and described in detail to illustrate the application of the principles of the invention, it will be understood that the invention may be embodied otherwise without departing from such principles.

What is claimed is:

1. An objective, for cameras or projectors, having a variable focal length and a constant intercept length on the image side, said objective comprising, in combination, a plurality of lenses; means mounting at least a first of said lenses in fixed position axially of the objective; means mounting at least a second of said lenses for axial movement thereof relative to said first lens to adjust the objective focal length, and at least a third of said lenses for axial movement relative to said first lens to adjust the focus or range of the objective; a common setting means operatively connected to said second and third lenses to effect both adjustment of the focal length and adjustment of the focus or range, said common setting means being movable in a direction axially of the objective in effecting one adjustment and in a direction angularly about the objective axis in effecting the other adjustment; and manually operable locking means operatively associated with said common setting means to releasably lock the latter against movement in at least one of said directions while said common setting means is moved in the other of said directions, said mounting means including a first mounting member for said second lens and a second mounting member for said third lens, said mounting members being axially adjustable relative to said first lens and being axially and angularly adjustable relative to each other; said locking means including clamping means on one of said mounting members engageable with the other mounting member to releasably lock said mounting members against movement relative to each other during movement of said common setting means in effecting one of said adjustments.

2. An objective, as claimed in claim 1, in which said locking means includes a ring rotatable about the objective axis and operatively engaged with said clamping means for displacing the latter to clamp said two mounting members to each other.

3. An objective, as claimed in claim 2, including an adjusting sleeve coaxial with the optical axis of the objective; said ring being mounted in embracing relation on said adjusting sleeve; said adjusting sleeve being fixedly connected to one of said mounting members, and having angularly spaced slots extending radially therethrough in a common diametric plane of the objective; the other mounting member including a cylindrical element extending within said adjusting sleeve and in radially spaced relation thereto; clamping jaws forming part of said clamping means, said clamping jaws being radially movable in said angularly spaced slots of said adjusting sleeve; said clamping means further including spring fingers secured to said adjusting sleeve in angularly spaced relation and extending parallel to the objective axis, each of said spring fingers being engaged by one of said jaws; the inner surface of said ring having cam formations effective, upon rotation of said ring, to move said jaws radially inwardly to depress said spring fingers against said cylindrical element to lock said cylindrical element to said adjusting sleeve.

4. An objective, for cameras or projectors, having a variable focal length and a constant intercept length on the image side, said objective comprising, in combination, a plurality of lenses; means mounting at least a first of said lenses in fixed position axially of the objective; means mounting at least a second of said lenses for axial movement thereof relative to said first lens to adjust the objective focal length, and at least a third of said lenses for axial movement relative to said first lens to adjust the focus or range of the objective; a common setting means operatively connected to said second and third lenses to effect both adjustment of the focal length and adjustment of the focus or range, said common setting means being movable in a direction axially of the objective in effecting one adjustment and in a direction angularly about the objective axis in effecting the other adjustment; and manually operable locking means operatively associated with said common setting means to releasably lock the latter against movement in at least one of said directions while said common setting means is moved in the other of said directions, said objective having a portion fixed against rotation and said locking means comprising detent means on said setting means interengageable with said portion of said objective fixed against rotation to lock said setting means against movement in one setting direction.

5. An objective, as claimed in claim 4, in which said setting means is a cylindrical member rotatable about the objective axis and movable axially thereof; said detent means comprising a pin mounted for radial movement through said setting means.

6. An objective, as claimed in claim 5, said detent means including a head on the inner end of said pin; said head being formed with teeth interengageable with teeth on such portion of said objective fixed against rotation.

7. An objective, as claimed in claim 6, said detent means including a spring biasing said pin in a radial direction to interengage said teeth.

8. An objective, for cameras or projectors, having a variable focal length and a constant intercept length on the image side, said objective comprising, in combination, a plurality of lenses; means mounting at least a first of said lenses in fixed position axially of the objective; means mounting at least a second of said lenses for axial movement thereof relative to said first lens to adjust the objective focal length, and at least a third of said lenses for axial movement relative to said first lens to adjust the focus or range of the objective; a common setting means operatively connected to said second and third lenses to effect both adjustment of the focal length and adjustment of the focus or range, said common setting means being movable in a direction axially of the objective in effecting one adjustment and in a direction angularly about the objective axis in effecting the other adjustment; and manually operable locking means operatively associated with said common setting means to releasably lock the latter against movement in at least one of said directions while said common setting means is moved in the other of said directions, said locking means having a first locking position in which it locks said setting means against movement in said one setting direction while said common setting means is moved in said other setting direction, and a second locking position in which it locks said common setting means against movement in said other setting direction while said common setting means is moved in said one setting direction.

9. An objective, as claimed in claim 8, including means releasably biasing said locking means to one of its locking positions.

10. An objective, as claimed in claim 9, said common setting means including a setting ring concentric with the optical axis of the objective and movable both axially and angularly of the objective; said locking means including a pin mounted for radial displacement through an aperture in said setting ring and having a head on its inner end extending laterally of the pin; said head having a first set of teeth on its radially outer surface and a second set of teeth on its radially inner surface; one set of teeth being engageable with teeth extending circumferentially of a portion of the objective fixed against axial displacement to lock said setting ring against axial movement during rotation of said setting ring; the other set of teeth being engageable with teeth extending longitudinally of a portion of the objective fixed against rotation to lock said setting ring against angular movement during axial movement of said setting ring.

11. An objective, as claimed in claim 1, in which said means mounting said first lens comprises a first substantially cylindrical sleeve coaxial with the optical axis of the objective and fixed against axial displacement; said first mounting member comprising a second substantially cylindrical sleeve coaxial with said first sleeve; means interconnecting said first and second sleeves and providing for axial movement of said second sleeve while inhibiting rotational movement thereof relative to said first sleeve; said second mounting member comprising a third sleeve concentrically telescoped with said second sleeve; said third sleeve being rotatable relative to said second sleeve; and means, including a pin in one of said second and third sleeves engaged in a helical guide in the other of said second and third sleeves effective, upon rotation of said third sleeve relative to said second sleeve, to displace said third sleeve axially relative to said second sleeve.

12. An objective, as claimed in claim 1, in which said means mounting said first lens comprises a first substantially cylindrical sleeve coaxial with the optical axis of the objective and fixed against axial displacement; said first mounting member comprising a second substantially cylindrical sleeve coaxial with said first substantially cylindrical sleeve; means interconnecting said first and second sleeves and providing for axial displacement of said second sleeve relative to said first sleeve while inhibiting rotation of said second sleeve relative to said first sleeve; said common setting means comprising a setting ring coaxial with said sleeves and movable angularly and axially of the objective; said second mounting member comprising a third substantially cylindrical sleeve coaxial with said first and second sleeves; means connecting said ring to said second sleeve for conjoint axial movement of said ring and said second sleeve and providing for rotation of said ring relative to said second sleeve; means interconnecting said first and third sleeves and providing for axial movement of said third sleeve relative to said first sleeve while inhibiting rotation of said third sleeve relative to said first sleeve; and pin and helical groove means interconnecting said third sleeve and said ring whereby, upon rotation of said ring, said third sleeve will be moved axially relative to said first and second sleeves.

13. An objective, as claimed in claim 1, in which said means mounting said first lens comprises a first substantially cylindrical sleeve coaxial of the optical axis of the objective and fixed against axial displacement; said first mounting member comprising a second substantially cylindrical sleeve coaxial with said first sleeve; means interconnecting said first and second sleeves and providing for axial displacement of said second sleeve relative to said first sleeve while inhibiting rotation of said second sleeve relative to said first sleeve; said second mounting member comprising a third sleeve coaxial with said first and second sleeves; means threadedly interconnecting said first and third sleeves; said common setting means comprising a setting ring coaxial with said sleeves and rotatable and axially movable relative to the optical axis of the objective; and means interconnecting said ring and said third sleeve and providing for axial movement of said ring relative to said third sleeve while inhibiting relative rotation of said ring and said third sleeve; whereby, upon rotation of said setting ring, said third sleeve is moved axially relative to said first sleeve.

References Cited by the Examiner

UNITED STATES PATENTS

| | | | |
|---|---|---|---|
| 2,984,154 | 5/1961 | Walker | 88—57 |
| 3,138,060 | 6/1964 | Eggert et al. | 88—57 X |
| 3,183,813 | 6/1965 | Wohner et al. | 88—57 X |

JEWELL H. PEDERSEN, *Primary Examiner.*

JOHN K. CORBIN, *Examiner.*

R. J. STERN, *Assistant Examiner.*